(12) United States Patent
Sjöberg et al.

(10) Patent No.: US 6,925,091 B1
(45) Date of Patent: Aug. 2, 2005

(54) MESSAGE TRANSMISSION SYSTEM

(75) Inventors: Per-Olof Sjöberg, Alvsjo (SE); Albin Johansson, Haninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/554,684

(22) PCT Filed: Nov. 19, 1998

(86) PCT No.: PCT/AT98/00281
§ 371 (c)(1),
(2), (4) Date: Oct. 29, 2002

(87) PCT Pub. No.: WO99/27749
PCT Pub. Date: Jun. 3, 1999

(30) Foreign Application Priority Data

Nov. 19, 1997 (AT) .......................................... A 1961/97

(51) Int. Cl.[7] .............................................. H04L 12/66
(52) U.S. Cl. ........................ 370/463; 370/485; 370/493
(58) Field of Search ................................ 370/293, 463, 370/485–488, 203–210, 276–285, 294, 352, 401, 465, 492–495; 375/222

(56) References Cited

U.S. PATENT DOCUMENTS

| 5,613,191 A | | 3/1997 | Hylton et al. | |
| 5,756,280 A | * | 5/1998 | Soora et al. | ................. 725/146 |
| 5,982,785 A | * | 11/1999 | Woerner et al. | ............. 370/488 |

FOREIGN PATENT DOCUMENTS

| DE | 4444312 C1 | 2/1996 |
| WO | WO 93/06602 | 4/1993 |
| WO | WO 97/11534 | 3/1997 |

OTHER PUBLICATIONS

ANSI T1E1.4/97–016, Zipper–a duplex scheme for VDSL based on DMT, Telia Research AB, pp. 1–12, Feb. 3–7, 1997.*

* cited by examiner

Primary Examiner—Frank Duong

(57) ABSTRACT

An information transmission system for simultaneously transmitting baseband signals and broadband signals via a two-wire line between a central office and at least one subscriber. In one embodiment, a shared bidirectional splitter filter mounted on a circuit board communicates in one direction toward the subscriber over a subscriber line, and communicates in an opposite direction toward the central office. A baseband communication unit and a broadband communication unit are mounted on the circuit board, and at least one hybrid circuit is interposed between the filter and the baseband unit and broadband units. A central interface control unit is also mounted on the circuit board. The central interface control unit communicates in one direction toward the central office, and communicates in an opposite direction toward the baseband and broadband units. In another embodiment, the bidirectional filter is replaced with a plurality of unidirectional filters and a shared hybrid circuit.

8 Claims, 4 Drawing Sheets

MESSAGE TRANSMISSION SYSTEM

BACKGROUND OF THE INVENTION

1. Field of the Invention

The invention relates to an information transmission system for the simultaneous transmission of analog or digital baseband signals, for example, POTS, ISDN, etc., and of broadband signals, for example ADSL, VDSL, etc., via a two-wire line from a central office, for example an automatic exchange, to at least one subscriber, with a baseband unit and a broadband unit that are connected by at least one hybrid circuit and at least one broadband filter formed of a high-pass and a low-pass filter with the subscriber line.

2. Description of Related Art

At the present time, known systems of this type exist, for example, in automatic exchanges of the public telephone network, whose operators offer broadband transmission capability for certain subscribers, as needed. But broadband service can be provided to subscribers not only in automatic exchanges but also in remote automatic exchanges connected to the former via a transmission link.

Broadband technologies, such as ADSL, VDSL, and xDSL, etc. use the frequency band above the baseband, which is used, for example, by POTS (Plain Old Telephone) or ISDN signals. These various transmission services use the same subscriber line as the transmission medium.

To give an example, the ADSL (asymmetric digital subscriber line) broadband transmission technology, which is becoming more and more popular, enables digital information transmission of large volumes of data via a two-wire subscriber line in one direction from the central office to the subscriber and the transmission of control functions in both directions. Currently, ADSL information transmission systems frequently use QAM technologies, for example DMT (discrete multiple tone modulation) or CAP (Carrierless phase modulation), whereby the formed signals overlie the analog or digital telephone signals, for example, POTS or ISDN, with respect to frequencies. The signal transmitted or to be transmitted is split via special broadband filters (ADSL filters) for receiving and superposed for transmission, both on the exchange side and the subscriber side.

At the central office, for example, the automatic exchange, the baseband unit, the broadband unit, and their common broadband filter are arranged separate from each other in different spatial areas; the different transmission units in the past were considered to be completely separate function blocks, which therefore also sometimes were arranged at points far apart within the automatic exchange.

The disadvantage of known information transmission systems of this type is therefore that the spatial separation results in significant wiring expenditures and requires additional space because of separate filter assemblies and separate racks for broadband or baseband units. Wiring expenditures hereby include not only the actual cross-connection work within the automatic exchange but also the documentation of how the individual, installed lines are associated with the interconnected units. These records constantly must be adjusted to the changes that are gradually made over time and require the archiving of data and maintenance of the archived data.

This means that the additional cost of maintenance resulting from each wiring, which manifests itself especially in personnel costs, is very important. The costs for the individual cross-connection points within the automatic exchange are also significant.

Another disadvantage is due to the fact that a separate processor control must be provided both for the broadband unit and for the baseband unit.

The objective of the invention is to describe an information transmission system of the initially mentioned type, which enables a reduction in the required space and wiring expense at the central office, especially with respect to cross-connecting and maintenance work.

Another objective is to reduce the preventive maintenance expense and equipment costs, for example, for cross-connection points, of the system, and of the number of individual interface controls for the system.

Another objective of the invention consists of creating an information transmission system in which existing transmission units can be easily adapted to additional, new ones.

BRIEF SUMMARY OF THE INVENTION

According to the invention this is achieved in that the baseband unit, the broadband unit, if required, the one (at least) hybrid circuit, and the one (at least) broadband filter are combined in one unit with a central interface control device.

This permits a centralized coordination of the operation and maintenance of the individual, different units. It is, for example, always known which type of transmission system the existing subscriber uses. If the subscriber now would like to upgrade an additional ADSL transmission unit in addition to its already existing POTS or ISDN unit, the correct broadband filter for the subscriber can be immediately provided, and the ADSL unit can be correctly configured. Another advantage is that the broadband filter can be adapted to the already existing properties of the POTS or ISDN units. If required by the connection of a certain broadband filter, even the POTS configuration can be readjusted correctly. The reason for this is that different telephone network providers specify specific real or complex line impedance levels for their POTS subscribers, which require, for example, an active broadband filter. If the POTS configuration is changed to purely real impedance, however, a passive broadband filter is sufficient.

Other advantages are the reduced maintenance and wiring expenditures achieved by the consolidation of the separate units, since this requires less related wiring work and cable maintenance. The reduced need for documentation resulting from this is another advantage of the communication system according to the invention. The central interface control eliminates the need for the additionally required, separate controls. It combines the otherwise separate controls; i.e. only one connection to the central office control is required, while the separate realization requires at least two connections.

In a particular preferred manner, one possible embodiment of the invention provides that the baseband unit, the broadband unit, and, if necessary, the one (at least) hybrid circuit, and the one (at least) broadband filter are combined on the same circuit board. This makes it possible to effectively use the advantages of combining baseband and broadband units.

In a further possible embodiment of the invention, the transmission output and reception output of the broadband unit or baseband unit are connected to the subscriber inputs or outputs of one each unidirectional broadband filter, and that the input and output of the two unidirectional broadband filters are connected with a common hybrid circuit.

Based on the special arrangement of this embodiment, the two unidirectional broadband filters are moved directly to the ADSL or POTS input, resulting in further reduction of the technical expenditure and costs. This avoids the otherwise necessary bidirectionality for the broadband filter, and instead, two unidirectional broadband filters are used, which can be installed with significantly less technical expenditure and therefore also at lower cost. Another factor contributing to this is that this reduces the requirements with respect to dielectric strength. In addition, each broadband filter can be optimized independently.

In another embodiment of the invention it may be provided that the common hybrid circuit, the two unidirectional broadband filters, the broadband unit, the baseband unit, and the central interface control device are all combined on one circuit board.

The arrangement on a common circuit board has the direct advantage that the signals transmitted on the subscriber line can be adapted better to the used transmission types. The various transmission services therefore are influenced less by call metering signals and calling signals.

According to another embodiment of the invention, the digital signal processor circuits associated with the baseband unit and the broadband unit can be combined into a central, digital signal processor circuit, resulting in a significant reduction in required components for filtering and encoding in the baseband and broadband unit.

According to another embodiment of the invention, it may be provided that the analog-to-digital converters associated with the baseband unit and the broadband unit are combined into a central analog-to-digital converter. This also permits a clear reduction in the cost of components.

According to another embodiment of the invention, it may be provided that the baseband unit, the broadband unit, the central interface control device, and possibly parts of the broadband filter(s) can be at least partially integrated. The integrated circuit hereby may be constructed as one component or a multi-component chipset.

This makes it possible to miniaturize individual units, and thus achieve a further reduction in space. By combining the devices for controlling, for analog-to-digital conversion, and for filtering for the baseband and broadband unit into one each functional unit also enables a significant reduction in energy losses. Compared to standard solutions, the integration also further reduces the total manufacturing costs and wiring expenditures. The following describes the invention in detail in reference to the embodiments shown in the drawings, whereby:

DETAILED DESCRIPTION OF THE INVENTION

Figure 1:
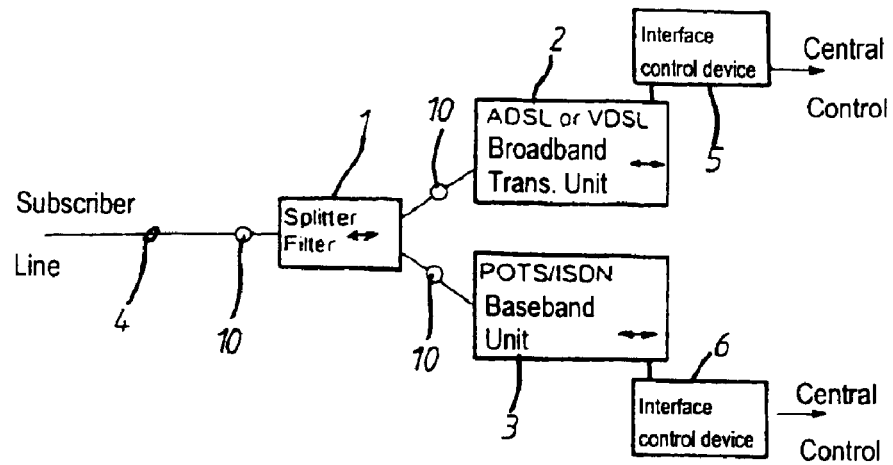
FIG. 1 shows a block switching diagram of an information transmission system according to the state of the art.

FIG. 1 shows an information transmission system for the simultaneous transmission of analog or digital baseband signals, for example, POTS, ISDN, etc., and of broadband signals, for example ADSL, VDSL, xDSL, etc., via a two-wire line 4 according to the state of the art, which is located at a central office, in this example in an automatic exchange. Such a central office could also be a private branch exchange, a remote automatic exchange, or a similar installation.

A baseband unit 3 through which the analog voice signals, for example POTS, or digital information, for example ISDN, of the telephone network is sent to or received by the connected subscriber at the other end of the subscriber line 4 is controlled via an interface control device 6 which again is connected to a central office control. The drawn-in nodes 10 are cross-connections in the main distributor of the automatic exchange, but which do not affect the function of data transmission. They are therefore not shown in FIG. 3. The baseband unit 3 exists for all subscribers that can be connected via the respective automatic exchange. As an additional transmission possibility, each subscriber, as required, also may be assigned a broadband transmission unit 2 whose functions are monitored via another interface control device 5.

Figure 5:
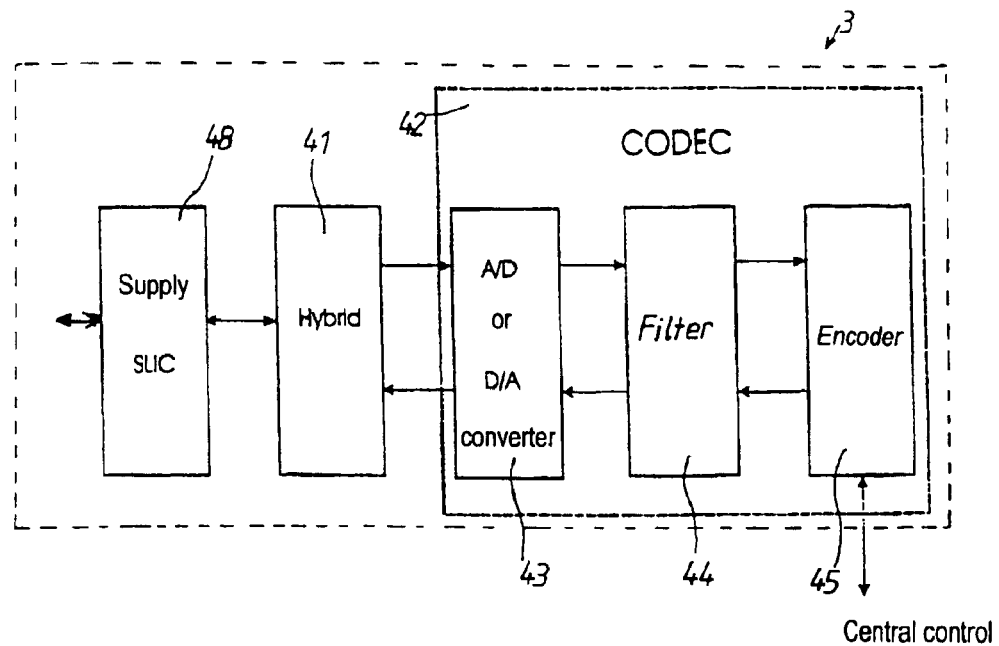
FIGS. 5 and 6 each show a block switching diagram of a subscriber interface circuit for a baseband and a broadband unit according to the state of the art.
Figure 6:
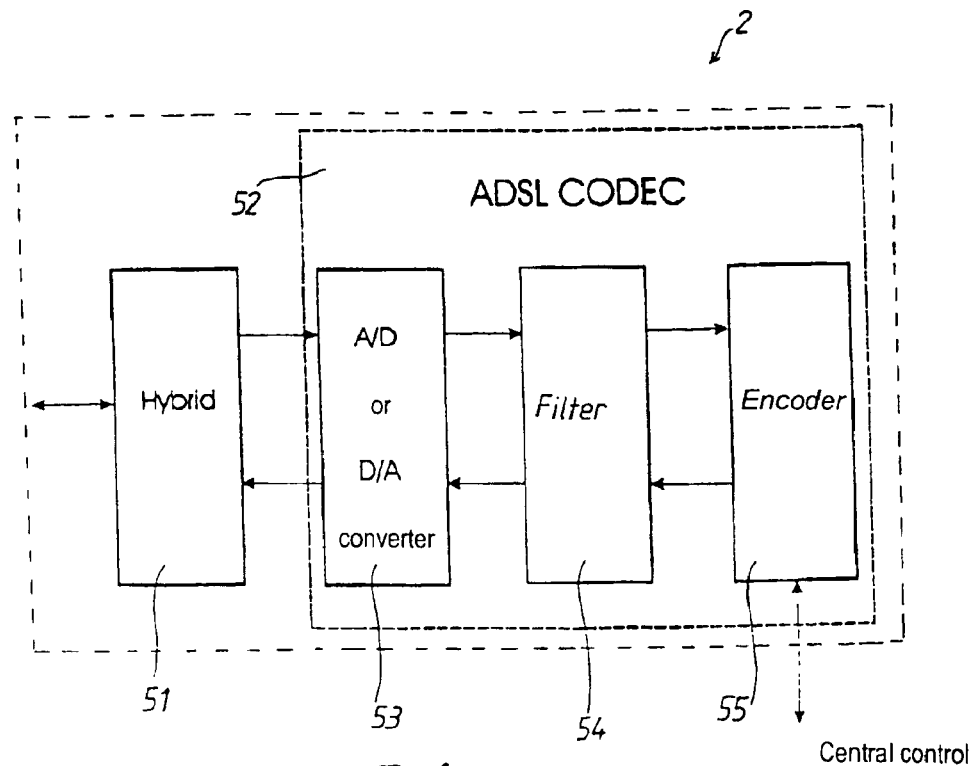

A block switching diagram of the internal construction of a baseband unit 3 is shown in FIG. 5, and that of a broadband unit is shown in FIG. 6.

Figure 4:
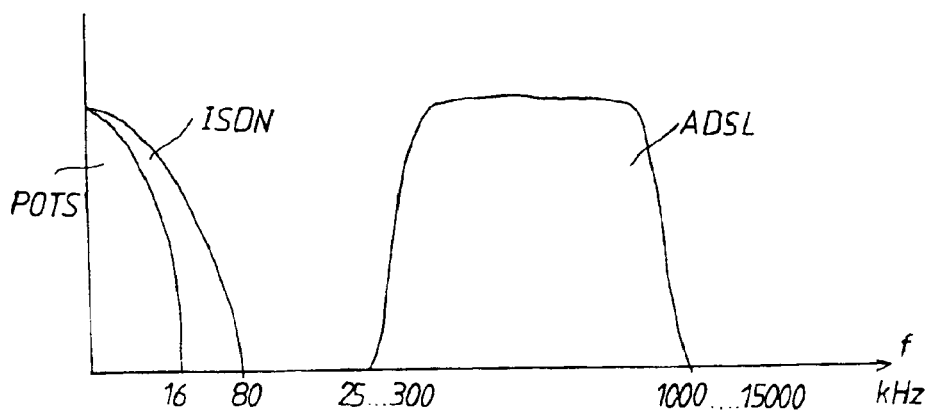
FIG. 4 shows a graph with the frequency ranges occurring on the transmission line of an information transmission system.

To split the frequency ranges of the superposed signal that comes in via subscriber line 4, a bidirectional broadband filter 1 is provided that is connected on one side with the subscriber line 4 and on the other side with the inputs or outputs of the baseband unit 3 and broadband unit 2. The signals sent by units 2 and 3 in the opposite direction are superposed in the broadband filter with respect to frequency and are transmitted to the subscriber. The frequency bands of POTS, ISDN, and ADSL signals occurring hereby are shown in FIG. 4.

Figure 7:
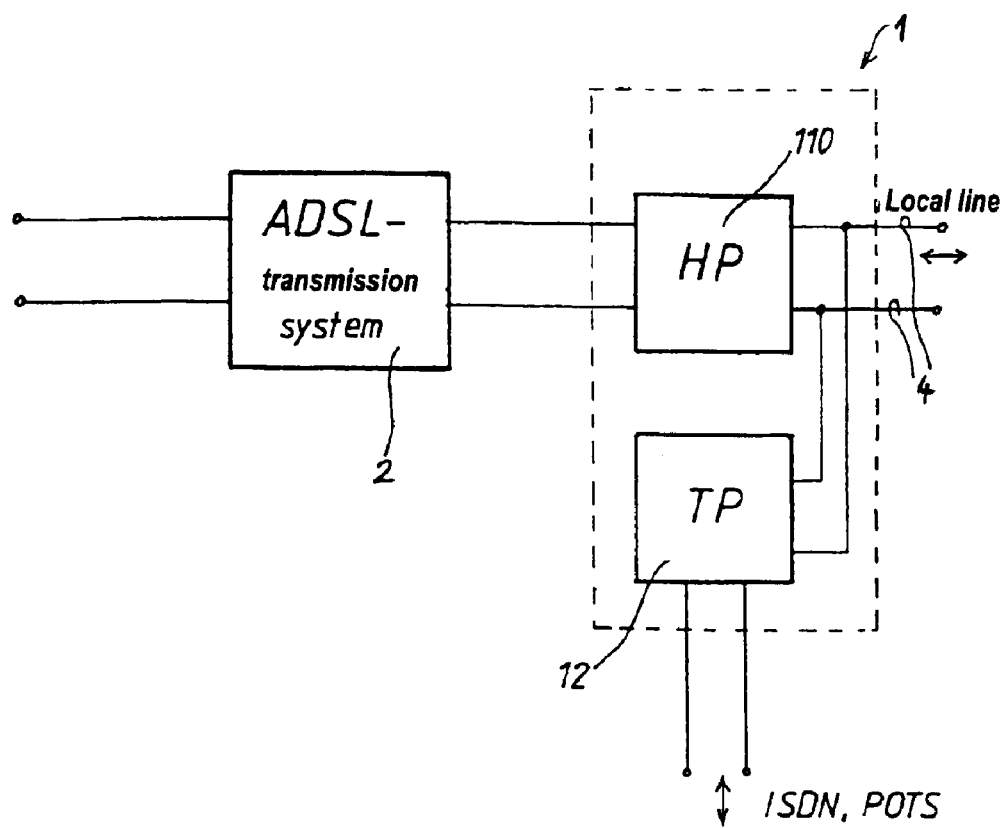
FIG. 7 shows an information transmission system with broadband transmission according to the state of the art.

The internal structure of a broadband filter 1 is shown in FIG. 7, whereby a bidirectional broadband transmission system 15 is connected via a high-pass filter 110, and ISDN and POTS units are connected via a low-pass filter 12 with a subscriber or local line 4. The dielectric strength of the high-pass and low-pass filter 110, 12 must be designed for the actually occurring calling and supply voltages.

Since the broadband unit 2 in FIG. 1 represents an additional service that may be chosen by the subscriber, it is located at another place in the automatic exchange than the baseband unit 3, for example, on another floor. The broadband filter 1 is also located separately from the other units in its own filter racks. This results in wiring and maintenance expenditures that this invention attempts to eliminate. An adaptation of the various services and of the broadband filter is also often very complicated since the locally separated units must be adapted to each other in a suitable manner.

Figure 2:
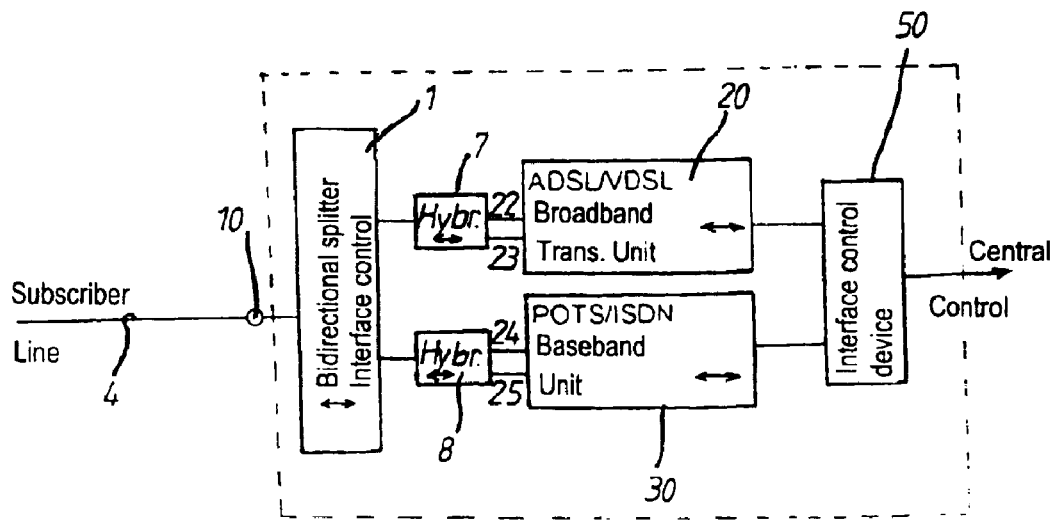
FIG. 2 shows a block switching diagram of an embodiment of the information transmission system according to the invention.

One embodiment of the invention is shown in FIG. 2, whereby hybrid circuits 7–8 not shown in the block switching diagram of FIG. 1 but which must be present there too (also see FIG. 5,6) that are required for operating the information transmission system are interposed between the baseband unit 30 or broadband unit 20 and the filter 1.

According to the invention the baseband unit 30, broadband unit 20, hybrid circuits 7, and common broadband filter 1 are combined into one unit with a central interface control 50. This places all of these functional units directly next to each other, preferably on a common circuit board. The dotted line around the units indicates this. This permits a significant reduction in the wiring and maintenance work and documentation expenditures, as well as the possibility of individual adaptation to existing line standards and filter types.

Figure 3:
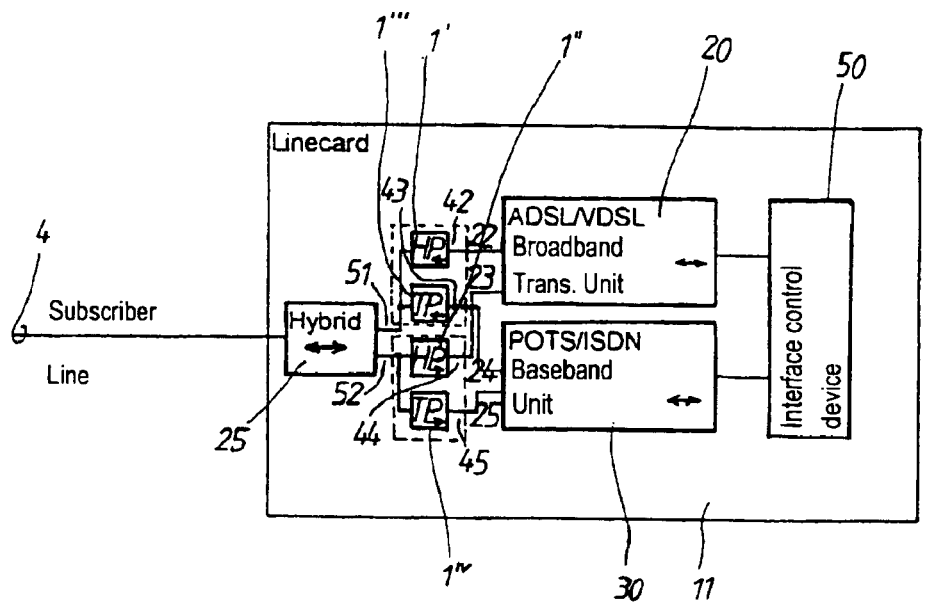
FIG. 3 shows a block switching diagram of another embodiment of the information transmission system according to the invention.

Another improvement to the system according to the invention can be achieved with the embodiment according to FIG. 3, since instead of a bidirectional filter several unidirectional filters are provided which are constructed at significantly lower cost. For this purpose, the transmission output 22, 24 and the reception input 23, 25 of the broadband unit 20 or baseband unit 30 are connected on the subscriber side with inputs 42, 43 or outputs 44, 45 of one each unidirectional broadband filter $1'$, $1'''$ or $1''$, $1^{IV}$.

Input 51 and output 53 of the two unidirectional broadband filters $1'$, $1'''$ or $1''$, $1^{IV}$ furthermore are connected with a common hybrid circuit 25. This separates the filter function into the two transmission directions and combines the hybrid circuit function into a functional block.

In order to achieve further simplification, the common hybrid circuit 25, the two unidirectional broadband filters $1'$, $1'''$ or $1''$, $1^{IV}$, the broadband unit 20, the baseband unit 30, and the central interface control device 50 are combined in FIG. 3 on one circuit board 11.

Another degree of unifying the combined units can be achieved if the digital signal processors (DSP) in the baseband unit 30 and broadband unit 20 can be combined, so that, for example, filtering and signal generation can be accomplished with a single DSP. In a similar manner, digital-to-analog converters and analog-to-digital converters of the baseband unit 30 and the broadband unit 20 in an integrated circuit also can be used several times.

To illustrate this, FIGS. 5 and 6 each show a CODEC 42 for a baseband unit and a CODEC 52 for a broadband unit in the form of a block switching diagram, whereby in addition to a bidirectional encoding unit 45, 55 and a bidirectional filter 44, 54 one each analog-to-digital or digital-to-analog converter, 43 and 53 respectively, are provided, and their converter function could be combined in the information transmission system according to the invention in a central analog-to-digital or digital-to-analog converter. In the same way, each of the digital signal processors provided for filtering in filters 44 and 54 can be combined in a central digital signal processor.

Finally, a further improvement of operating conditions can be achieved in that the baseband unit 30, broadband unit 20, central interface control device 50, and, as required, parts of the broadband filter 1 (FIG. 2) or broadband filters $1'$, $1'''$ or $1''$, $1^{IV}$ (FIG. 3) are at least partially integrated or constructed as an integrated circuit. The integrated circuit hereby can be constructed as a component or as a chipset consisting of several components.

What is claimed is:

1. An information transmission system for simultaneously transmitting baseband signals and broadband signals via a two-wire line between a central office and at least one subscriber, said system comprising:
   a shared bidirectional splitter filter mounted on a circuit board, said filter communicating in one direction toward the subscriber over a subscriber line, and communicating in an opposite direction toward the central office;
   a baseband communication unit mounted on the circuit board;
   a broadband communication unit mounted on the circuit board;
   at least one hybrid circuit mounted on the circuit board interposed between the filter and the baseband unit, and between the filter and the broadband unit; and
   a central interface control unit mounted on the circuit board, said central interface control unit communicating in one direction toward the central office, and communicating in an opposite direction toward the baseband and broadband units.

2. The information transmission system of claim 1, wherein the baseband unit and the broadband unit each have an associated signal processing circuit, and the signal processing circuit for the baseband unit is combined with the signal processing circuit for the broadband circuit in a central digital signal processor circuit mounted on the circuit board.

3. The information transmission system of claim 1, wherein the baseband unit and the broadband unit each have an associated analog-to-digital converter, and the analog-to-digital converter for the baseband unit is combined with the analog-to-digital converter for the broadband circuit in a central analog-to-digital converter mounted on the circuit board.

4. The information transmission system of claim 1, wherein the baseband unit, the broadband unit, and the central interface control unit are at least partially integrated into a single integrated circuit on the circuit board.

5. The information transmission system of claim 1, wherein the integrated circuit is constructed as a single component or a multi-component chipset.

6. An information transmission system for simultaneously transmitting baseband signals and broadband signals via a two-wire line between a central office and at least one subscriber, said system comprising:
   a shared hybrid circuit mounted on a circuit board, said hybrid circuit communicating in one direction with the subscriber over a subscriber line, and communicating in an opposite direction with the information transmission system;
   a baseband communication unit mounted on the circuit board;
   a broadband communication unit mounted on the circuit board;
   a plurality of unidirectional low-pass and high-pass filters mounted on the circuit board, wherein the low-pass filters are interposed between the shared hybrid circuit and the baseband unit, and the high-pass filters are interposed between the hybrid circuit and the broadband unit; and
   a central interface control unit mounted on the circuit board, said central interface control unit communicating in one direction with the central office, and communicating in an opposite direction with the baseband and broadband units.

7. The information transmission system of claim 6, wherein two unidirectional low-pass filters, passing information in opposite directions, are connected to the baseband unit, and two unidirectional high-pass filters passing information in opposite directions are connected to the broadband unit.

8. A circuit for transmitting baseband signals and broadband signals via a two-wire line between a central office and a subscriber, said circuit comprising the following elements mounted on a single circuit board:
   a shared hybrid circuit communicating in one direction toward the subscriber over a subscriber line, and communicating in a opposite direction toward the central office;

a baseband communication unit;

a broadband communication unit;

a first unidirectional low-pass filter interposed between the shared hybrid circuit and the baseband unit, said first unidirectional low-pass filter passing information in the direction toward the subscriber;

a second unidirectional low-pass filter interposed between the shared hybrid circuit and the baseband unit, said second unidirectional low-pass filter passing information in the direction toward the central office;

a first unidirectional high-pass filter interposed between the shared hybrid circuit and the broadband unit, said first unidirectional high-pass filter passing information in the direction toward the subscriber;

a second unidirectional high-pass filter interposed between the shared hybrid circuit and the broadband unit, said second unidirectional high-pass filter passing information in the direction toward the central office; and a central interface control unit interposed between the central office and the baseband and broadband units, said central interface control unit communicating in one direction toward the central office, and communicating in an opposite direction toward the baseband and broadband units.

* * * * *